Patented Aug. 31, 1948

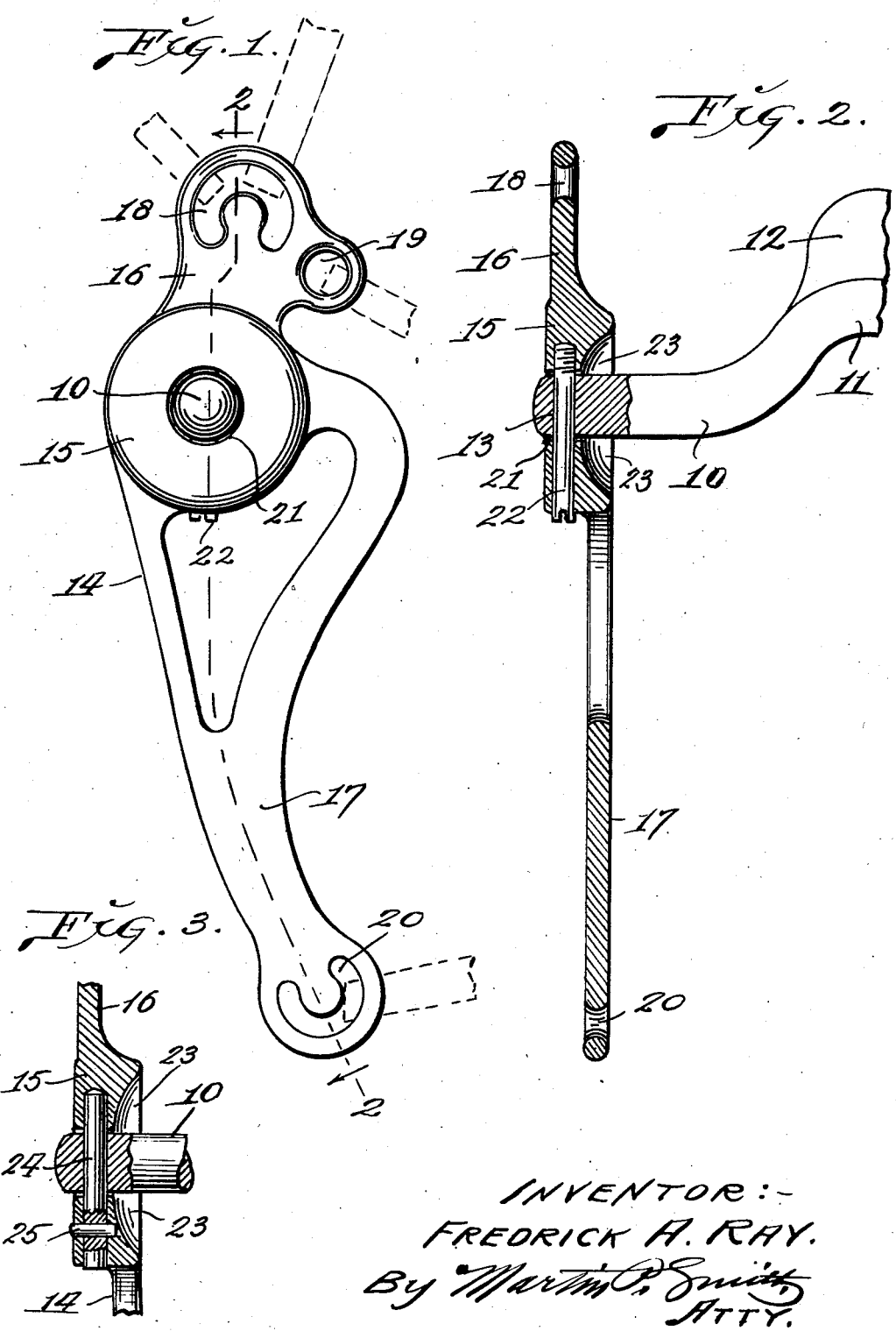

2,448,276

UNITED STATES PATENT OFFICE 2,448,276

OFFSET BIT SHANK

Fredrick A. Ray, Reseda, Calif.

Application November 4, 1946, Serial No. 707,605

6 Claims. (Cl. 54—7)

My invention relates generally to bridle bits and more particularly to an offset bit, i. e., a bit wherein those portions of the shanks or cheek pieces of the bit above and below the conchas are offset or disposed in different vertical planes and the principal object of my invention is, to provide a simple, practical and inexpensive offset shank structure which may be advantageously employed in concha or gate hinge type bits, or where the shanks and mouth pieces are integral or solid.

A further object of my invention is, to provide improved means for securing the ends of the mouthpiece to the conchas forming parts of the shanks or cheek pieces of gate hinge type bits, and further, to form the inner faces of the conchas of the shanks so as to entirely eliminate possibility of pinching the sides of the mouth and lips of the horse to which the improved bit is applied.

With the foregoing and other objects in view, my invention consists of certain novel features of construction and arrangement of parts which will be hereinafter more fully described and claimed and illustrated in the accompanying drawings, in which:

Fig. 1 is a side elevational view of an offset bit constructed in accordance with my invention.

Fig. 2 is a vertical section taken on the line 2—2 of Fig. 1.

Fig. 3 is a detail vertical section showing a modified form of connecting the mouthpiece to the shank.

Referring by numerals to the accompanying drawings, particularly Figs. 1, 2 and 3, which illustrate a concha or gate hinge type bit, 10 designates a mouthpiece, which may be any desired form, for instance with a centrally disposed part 11 surmounted by a spoon 12 and formed through the ends of this mouthpiece are upright diametrically disposed apertures 13.

Mounted on each end of mouthpiece 10, is a shank or cheek piece such as 14, each shank comprising a substantially circular disc or plate that forms the concha 15, a short lobe-sharped plate 16, integral with and projecting upwardly from said concha and an elongated arm or plate 17, integral with and depending from the underside of said concha.

Each plate 16 is disposed in a vertical plane immediately adjacent the outer face of the concha 15 and formed in the upper portion of said plate is an aperture 18, preferably arcuate in shape for the reception of the cheek strap and bosal parts of the bridle, and an aperture 19 is formed in the lower rear portion of said plate, for the reception of the conventional curb.

The upper portion of shank member 17, or that portion that is formed integral with and depends from the concha 15, is preferably bifurcated so as to combine lightness of weight, ample strength and proper balance for the entire shank and said lower portion 17 is connected to the concha just inside the inner face thereof, and thus said portion 17 occupies a vertical plane that is offset inwardly from the parallel plane occupied by upper shank portion 16.

Formed in the lower end portion of shank member 17, is an aperture 20 for the reception of the bridle rein. Formed in the center of the concha 15, is an aperture 21 for the reception of the end of mouthpiece 10, and to provide a vertical hinge between the shank and mouthpiece, a screw 22 passes upwardly through an aperture in the lower portion of the concha 15, outside of shank member 17, through aperture 13 in mouthpiece 10 and the threaded upper end of said screw is seated in the concha above aperture 21.

Thus the shanks or cheek pieces 14 are mounted so as to swing for limited distances on vertical axes provided by the screws 22, at both ends of the mouthpiece, thus imparting to the bit and mouthpiece a desirable degree of flexibility.

To prevent the lips at the sides of the horse's mouth from being pinched between the end portions of the mouthpiece 10 and the conchas, the inner faces of the latter are dished or recessed as designated by 23, with the deepest portions of said recesses disposed about the mouthpiece, adjacent the screws 22.

In Fig. 3 I have shown the end of mouthpiece 10 pivotally connected to the concha by means of a pin 24 which passes upwardly through the bottom of the concha, through the end of said mouthpiece, into the concha above aperture 21, and said pivot pin being anchored to the concha by a small pin 25 driven into the lower portion of said concha and pivot pin.

Plates 16 are located immediately adjacent the outer faces of the conchas 15, so as to provide a small space for the increasing width of the horse's head above the mouth, also for maintaining the ends of the head straps and curb as far away from the horse's cheeks as possible.

The readily removable pins such as 22 and 24, enable different mouth pieces to be easily and quickly interchanged.

To provide a solid or practically one-piece bit, the ends of mouthpiece 10 are secured to the centers of the conchas integrally or otherwise.

Thus it will be seen that I have provided an offset bit that is simple in structure, inexpensive of manufacture and very effective in performing the functions for which it is intended.

Various minor changes in the size, form and construction of the various parts of my improved offset bit may be made and substituted for those herein shown and described, without departing from the spirit of the invention, the scope of which is set forth in the appended claims:

I claim as my invention:

1. In an offset bit, a shank having upper and lower portions occupying different vertical planes a mouthpiece hinged to said shank between said upper and lower portions, with the axis of the hinge vertically disposed and in vertical alignment with the upper portion of said shank.

2. In an offset bit, a shank comprising a concha, a shank member projecting upwardly from said concha adjacent its outer face and a shank member depending from said concha adjacent its inner face.

3. An offset bit as set forth in claim 2, with a mouthpiece connected to said concha.

4. An offset bit as set forth in claim 2 with a mouthpiece hinged on a vertical axis to said concha.

5. An offset bit as set forth in claim 2, the inner face of which concha is recessed.

6. In an offset bit, the combination with a mouthpiece, of shanks provided with apertures for the reception of the ends of said mouthpiece, those portions of the shanks below said apertures being inset with respect to those portions of the shanks above said apertures, vertically disposed pivot pins seated in said shanks outwardly from the insert lower portions thereof, which pivot pins pass upwardly through the ends of said mouthpiece and there being recesses in the inner faces of said shanks around said mouthpiece receiving apertures.

FREDRICK A. RAY.

REFERENCES CITED

The following references are of record in the file of this patent:

UNITED STATES PATENTS

| Number | Name | Date |
| --- | --- | --- |
| 150,488 | Slaughter | May 5, 1874 |

FOREIGN PATENTS

| Number | Country | Date |
| --- | --- | --- |
| 5,969 | Great Britain | 1897 |